United States Patent [19]

Lovering

[11] Patent Number: 4,619,541
[45] Date of Patent: Oct. 28, 1986

[54] BUILDERS SCAFFOLDING

[75] Inventor: Dennis W. Lovering, Wolverhampton, United Kingdom

[73] Assignee: GKN Kwikform Limited, London, England

[21] Appl. No.: 740,844

[22] PCT Filed: Oct. 2, 1984

[86] PCT No.: PCT/GB84/00336
§ 371 Date: May 20, 1985
§ 102(e) Date: May 20, 1985

[87] PCT Pub. No.: WO85/01770
PCT Pub. Date: Apr. 25, 1985

[30] Foreign Application Priority Data

Oct. 8, 1983 [GB] United Kingdom ............... 8326991

[51] Int. Cl.⁴ .......................... E04G 7/00; F16B 7/00
[52] U.S. Cl. .................................. 403/49; 403/246;
182/179
[58] Field of Search ............... 403/49, 246; 182/179

[56] References Cited

U.S. PATENT DOCUMENTS 4,522,527 6/1985 Grandpierre ..................... 403/246

FOREIGN PATENT DOCUMENTS 2516666 10/1976 Fed. Rep. of Germany.
2069263 9/1971 France.
2351229 12/1977 France.
1430764 4/1976 United Kingdom.

Primary Examiner—Andrew V. Kundrat
Attorney, Agent, or Firm—Marshall, O'Toole, Gerstein, Murray & Bicknell

[57] ABSTRACT

A releasably engageable builders scaffolding assembly comprises an upright member, cross members and brace members wherein a cross member and a brace member are connected to the upright member by means of a wedge securing both said members to a socket on the upright member. A cross member is connected to the upright member by means of a channel shaped connector straddling a socket and affording a space therebetween for the reception of a grooved spigot extending from a brace member which spigot is retainable by the wedge passing through the cross member connector and a socket.

8 Claims, 2 Drawing Figures

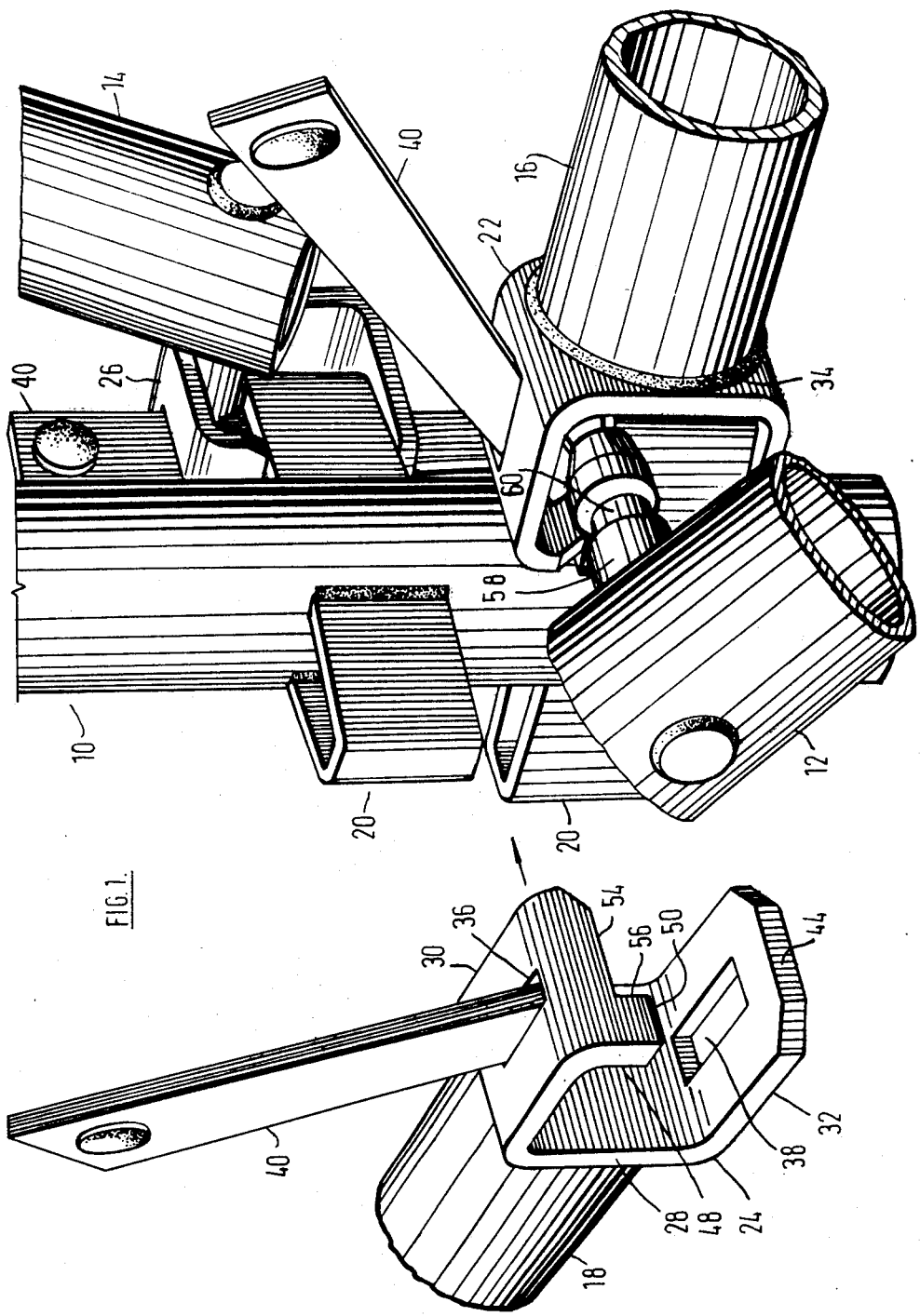

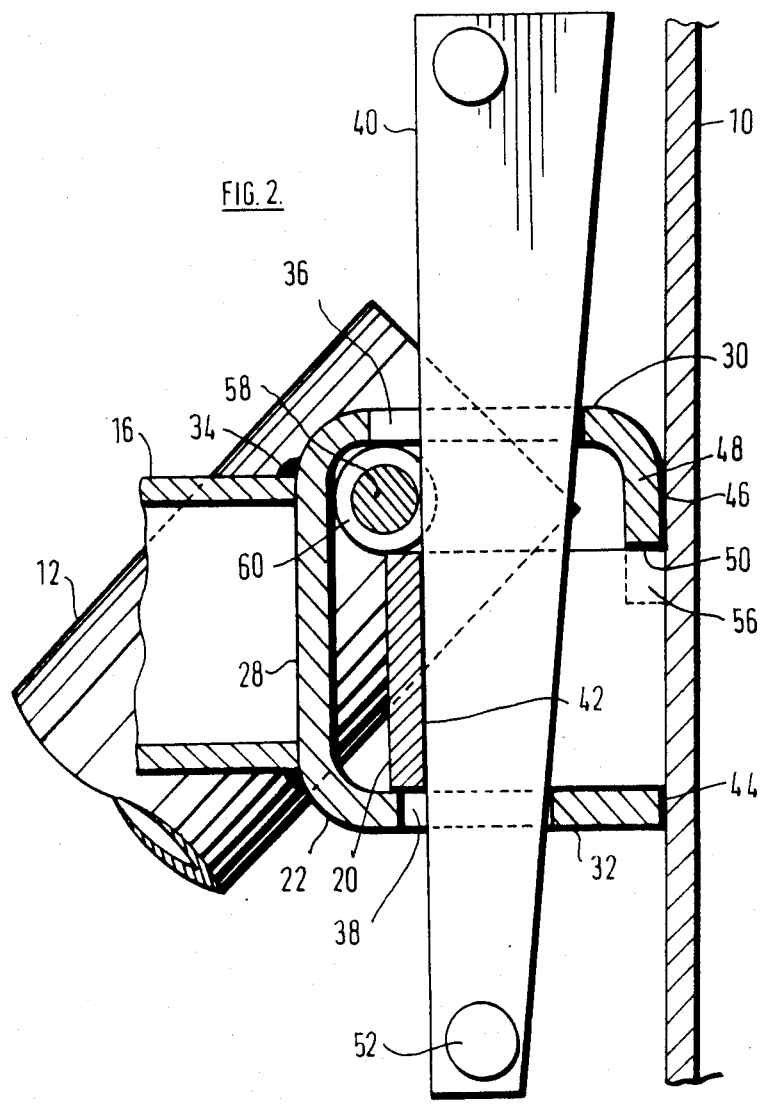

BUILDERS SCAFFOLDING

This invention relates to builders scaffolding of the kind which comprises an upright member, a cross member and connecting means for detachably connecting the upright member and cross member together, wherein the connecting means comprises a socket mounted on the exterior of the upright member the socket being open at each of its two opposite ends which are spaced apart along the length of the upright member, the connecting means further comprising connector means provided at or near one end of the cross member and including two limbs which in the operative position are spaced apart vertically to permit of the upright member socket being received therebetween, each limb having an abutment face adapted to abut against the upright member, each limb further being provided with an opening which receives a wedge clamping member forming part of the connecting means, the arrangement being such that in connecting the cross member to the upright member the two limbs of the connector means are disposed vertically spaced apart and straddle the socket with the wedge clamping member extending through the two open ends of the socket in pressure engagement with an edge of the opening of each of the two limbs which is nearest to the upright member and also with an internal clamping face of the socket, in such a manner that the said abutment faces of the two limbs are brought into pressure engagement with the upright member at positions above and below the socket. Such builders scaffolding is hereinafter referred to throughout this specification and claims as being of the kind specified.

An object of the present invention is to provide an improved builders scaffolding of the kind specified in combination with a brace member to form a releasably engageable builders scaffolding assembly.

In accordance with the invention there is provided a releasably engageable builders scaffolding assembly comprising builders scaffolding of the kind specified in combination with a brace member wherein the brace member is provided at or adjacent one end thereof with a spigot extending transversely of the brace member, said spigot being retained by said wedge clamping member between the connector means and an adjacent part of the socket.

Preferably in the said builders scaffolding of the kind specified in such a releasably engageable builders scaffolding assembly the abutment face of the, in use, upper limb of the connector means comprises a face of a flange depending downwardly from that portion of said upper limb having the wedge clamping member opening therein, the lowermost free edge of the flange providing a socket engaging edge which, in use, contacts the upper edge of the socket to define a space between said portion of said upper limb and the upper edge of the socket receiving the spigot of the brace member therein, the spacing between the socket engaging edge of said flange of said upper limb and the socket engaging face of the other limb of the connector means being such as to receive said socket therebetween.

The invention also provides a brace member for use with builders scaffolding of the kind specified wherein each end of the brace member is provided with a spigot extending transversely thereof, the spigot, in use, being retainable by said wedge clamping member between the connector means and an adjacent part of the socket.

The cross member of the builders scaffolding described above is conveniently constructed so that the free edge of the said flange includes a guide edge spaced upwardly of said socket engaging edge and an abutment shoulder extending between said guide edge and said socket engaging edge whereby, in use, said guide edge and abutment shoulder locate the cross member relative to a socket on the upright member when the connector means of the cross member is initially presented transversely to said socket prior to the connection of the cross member to the upright member. Conveniently the guide edge and the socket engaging edge of the flange are planar edges and are parallel to one another and said abutment shoulder comprises a planar abutment edge extending perpendicular to each of said guide edge and said socket engaging edge.

The brace member for use with the builders scaffolding as described above, and for use in said releasably engageable builders scaffolding assembly, is conveniently so constructed that the spigot on the brace member includes a recess engageable by an edge of the wedge clamping member. Preferably the spigot on the brace member is of cylindrical form and includes an annular groove around its periphery engageable by a said edge of the wedge clamping member so that the brace member may be readily disposed at any convenient angle to the upright member and/or the cross member.

When the brace member is used in combination with the builders scaffolding as described above, the spigot on the brace member is retainable by the wedge clamping member within the space between the upper limb of the connector means and the upper edge of the socket.

Other features of the invention will become apparent from the following description given herein solely by way of example with reference to the accompanying drawings wherein:

FIG. 1 is an isometric view of a releasably engageable builders scaffolding assembly in accordance with the invention showing different stages in the connection together of a cross member, a brace member and an upright member and;

FIG. 2 is a side cross sectional view of a connected together assembly of cross-member, brace member and upright member.

In FIG. 1 of the drawings there is shown a multiple connection between an upright member 10, two brace members 12 and 14, and three cross members, only two of which referenced as 16 and 18 are visible in FIG. 1. The upright member 10 is disposed in a vertical position, the cross-members 16 and 18 are disposed horizontally whilst the brace members 12 and 14 are shown inclined at an angle of approximately 45° to the upright member 10 although, as will become apparent from the following description, the brace members may be readily disposable at any angle relative to the upright member and/or a cross member.

The upright member 10 is provided in known manner with sockets 20 at spaced intervals along its length conveniently arranged as shown in FIG. 1 in groups of four; each group comprising two pairs of diametrically opposed sockets with each pair being one above the other and at 90° to one another. Each socket 20 may be formed by bending a flat metal strip to form a generally channel shaped member including a pair of limbs the ends of which are welded to the exterior of the upright member 10.

A respective connector means 22 and 24 is provided at the or each end of each cross member 16 and 18 (and a similar connector means 26 is provided on the other cross member which is not visible in FIG. 1) and such connector means may also be a pressing of generally channel section with a vertically disposed web 28 and upper and lower limbs 30 and 32. The connector means is secured to the end of a respective cross member by welding the end of the cross member to the web 28 of the connector means as is clearly shown at 34 in the drawings.

The upper limb 30 of each connector means has a portion formed with an opening in the form of a slot 36 and the lower limb 32, which is parallel to said portion of the upper limb 30, is formed with another opening also in the form of a slot 38. The two slots 36 and 38 are of dimensions suitable for receiving an associated wedge clamping member 40. The length and disposition of each of the slots 36 and 38 in their respective limbs is selected in accordance with the angle between the wedging faces of the wedge clamping member 40 and the disposition of abutment faces of the two limbs in relation to the internal clamping face 42 of the associated socket 20 when the connector means is in use to secure a cross member to the upright member 10. The abutment face 44 of the lower limb 32 is constituted by the free edge of such limb but the abutment face 46 of the upper limb 30 is constituted by a face of a flange 48 depending downwardly from said portion of the upper limb which has the slot 36 therein. Such flange 48 depends perpendicularly downwardly from said portion of the upper limb 30 and has a lowermost free edge providing a socket engaging edge 50 which, in use, contacts the upper edge of a socket 20 to define a space between the said portion of the upper limb 30 and the upper edge of a socket 20 to receive a spigot of a brace member as will be further described herein. Said space also accommodates a retaining formation 52 provided on the lowermost end portion of the wedge clamping member 40 to render the wedge clamping member captive relative to the connector means when a member 40 is in its cocked, stable position as is shown in FIG. 1 with respect to the connector means 22.

The free edge of the flange 48 further includes a guide edge 54 spaced upwardly of the socket engaging edge 50 and an abutment shoulder 56 extending between the guide edge 54 and the socket engaging edge 50 whereby, in use, the guide edge 54 and abutment shoulder 56 locate a cross member relative to a socket 20 on the upright member 10 when the connector means of the cross member is initially presented transversely to the socket 20 prior to the connection of the cross member to the upright member. Said guide edge 54 and socket engaging edge 50 of the flange 48 are conveniently planar edges and are parallel to one another and said abutment shoulder 56 comprises a planar abutment edge extending perpendicular to each of said guide edge and said socket engaging edge; the locating action of the guide edge 54 and abutment shoulder 56 being clearly shown on FIG. 1 wherein a cross member 18 is to be presented in the direction of the arrow to a socket 20 on the upright member 10.

Various types of loading on a cross-member can induce shear forces in the wedge clamping member 40 between the edges of a socket 20 and the abutment faces 44 and 46 on the respective lower and upper limbs 32 and 30 of the connector means. In the arrangement shown, the space between the upper edge of a socket 20 and the upper limb 30 is present at a wider part of the wedge clamping member 40.

The builders scaffolding described so far comprises cross members and an upright member with connecting means therebetween but such scaffolding also provides in accordance with the invention a releasably engageable assembly of such scaffolding in combination with brace members.

Two brace members 12 and 14 are shown in FIG. 1 of the drawings each of which has, at one or each end thereof, a spigot 58 in the form of a cylindrical projection extending transversely of the brace member perpendicular to the longitudinal axis thereof. Each brace member itself comprises a tube having two diametrically opposed holes therein at or adjacent one or each end thereof for reception of the spigot 58; the spigot being welded in position to the brace member 12 or 14. The projecting end of the spigot 58 is provided with annular groove 60 around its periphery and is so dimensioned that it may fit into the space afforded between the said portion of the upper limb 30 of a connector means and the upper edge of a socket 20 to which said means is connected as is clearly shown in FIG. 2. As is shown in FIG. 1, a brace member 12 may be presented transversely to a cross-member 16 and socket 20 after the cross member has been located with respect to the socket but before the wedge clamping member 40 has been displaced from its cocked, stable position. After the spigot 58 has been inserted into the space, the wedge clamping 40 member may then be driven vertically downwardly to effect the clamping action between the cross member and the upright member and, at the same time, to retain the spigot of the brace member. Retention of a brace member 12 or 14 is accomplished by engagement of that edge of the wedge clamping member 40 remote from the upright member 10 within the annular groove 60 whereby the brace member is retained against movement outward of the connector means but is permitted to adapt a desired angular orientation relative to the upright member 10 and/or the cross member. It will be appreciated that, with respect to FIG. 2, the wedge clamping member 40 engages the edges of the respective openings 36 and 38 in the limbs 30 and 32 to effect the clamping action between a cross member and an upright member but that the other edge of the wedge clamping member 40 does not actually clamp onto the spigot 58 of a brace member. The groove 60 in a spigot 58 is so dimensioned that the wedge clamping member 40 may engage within the groove 60 to retain the bracing member in position in the assembly without interfering with the actual clamping action of the wedge clamping member 40.

I claim:

1. A releasably engageable builders scaffolding assembly comprising an upright member, a brace member, a cross member and connecting means for detachably securing the upright member and cross member together, the connecting means comprising a socket mounted on the exterior of the upright member and being open at each of its two opposite ends which are spaced apart along the length of the upright member, and a connector at one end of the cross member including two limbs which are spaced apart vertically to permit the socket to be received therebetween, each limb having a respective abutment face to abut the upright member, each limb further being provided with a respective opening which receives a wedge clamping member forming part of the connecting means;

characterized in that the brace member is provided at one end thereof with a spigot extending perpendicularly therefrom, said spigot having a recess extending circumferentially thereof wherein an edge of the wedge clamping member is engageable to retain said spigot between the connector and an adjacent part of the socket, whereby said upright member, said brace member and said cross member are all releasably engaged together to form said assembly.

2. An assembly as claimed in claim 1 further characterized in that the abutment face of an upper limb of the connector comprises a face of a flange depending downwardly from that portion of said upper limb having the wedge clamping member opening therein, a lower free edge of the flange providing a socket engaging edge which is adapted to contact the upper edge of the socket to define a space between said portion of said upper limb and the upper edge of the socket receiving the spigot of the brace member therein, the spacing between the socket engaging edge of said flange of said upper limb and the socket engaging face of the other limb of the connector being such as to receive said socket therebetween.

3. An assembly as claimed in claim 2 further characterized in that the free edge of the flange includes said socket engaging edge and an abutment shoulder extending downwardly of said socket engaging edge whereby said socket engaging edge and abutment shoulder locate the cross member relative to a socket on the upright member when the connector of the cross member is initially presented transversely to said socket prior to the connection of the cross member to the upright member.

4. An assembly as claimed in claim 3 further characterized in that the socket engaging edge of the flange is a planar edge and said abutment shoulder comprises a planar abutment edge extending perpendicularly to said socket engaging edge.

5. An assembly as claimed in claim 1 further characterised in that the spigot on the brace member is retained by said wedge clamping member between said, in use, upper limb of the connector means and the upper edge of the socket.

6. An assembly as claimed in claim 1 further characterised in that the spigot on the brace member is of cylindrical form and includes an annular groove around its periphery engagable by an edge of the wedge clamping member.

7. A brace member for use in a releasably engageable builders scaffolding assembly comprising an upright member, said brace member, a cross member and connecting means for detachably securing the upright member and cross-member together; the connecting means comprising a socket mounted on the exterior of the upright member and being open at each of its two opposite ends which are spaced apart along the length of the upright member, and a connector at one end of the cross member including two limbs which are spaced apart vertically to permit the socket to be received therebetween, each limb having a respective abutment face to abut the upright member, each limb further being provided with a respective opening which receives a wedge clamping member forming part of the connecting means; characterized in that said brace member is provided at each end thereof with a spigot extending perpendicularly therefrom, each said spigot having a recess extending circumferentially thereof wherein an edge of the wedge clamping member is engageable to retain said spigot between the connector and an adjacent part of the socket.

8. A brace member as claimed in claim 7 further characterized in that each said spigot on the brace member is of cylindrical form and has an annular groove extending circumferentially thereof wherein an edge of the wedge clamping member is engageable.

* * * * *